Dec. 5, 1939.  E. MAGNANO  2,182,673
SCREW DRIVER
Filed March 16, 1938
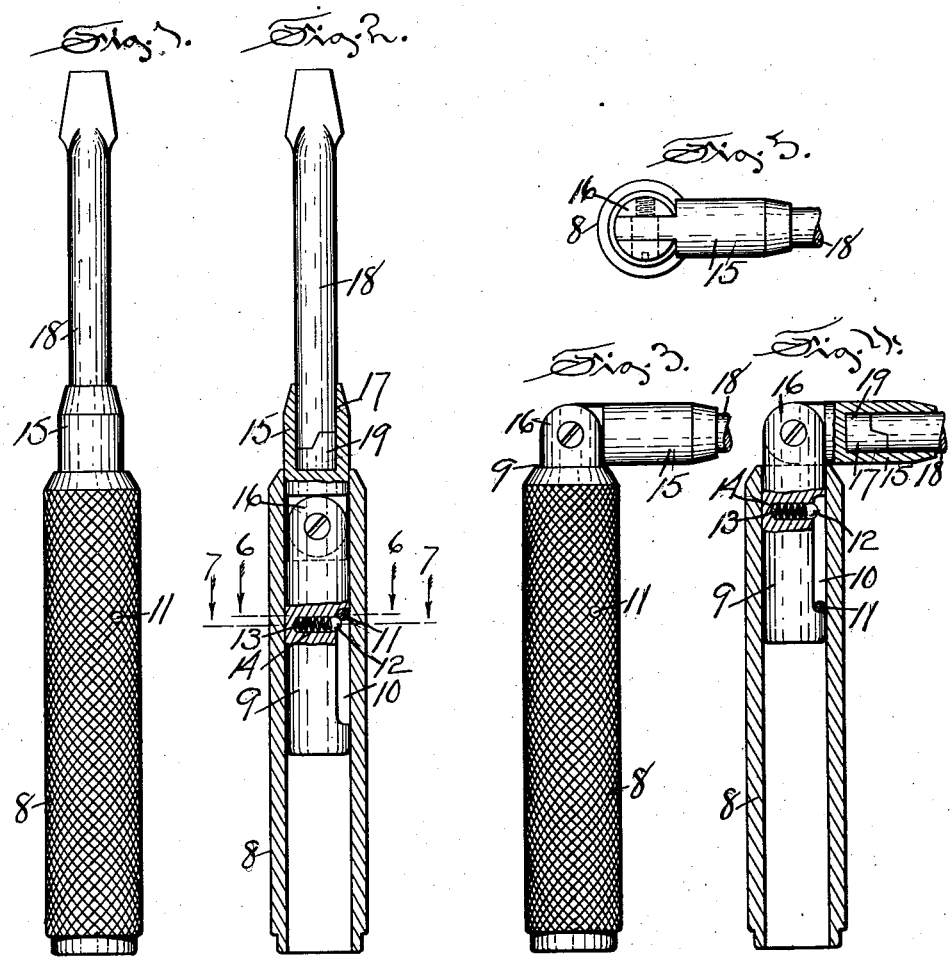
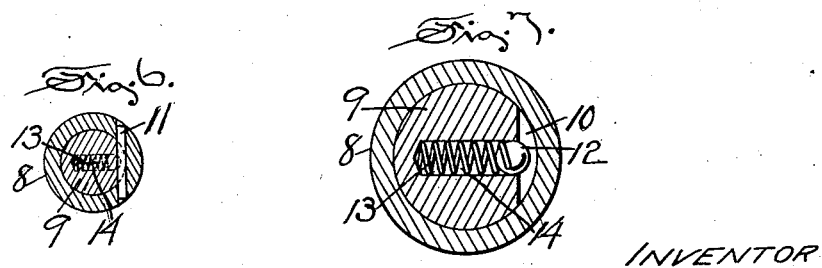
INVENTOR
Everino Magnano.
by
Arthur B. Jenkins,
ATTORNEY Patented Dec. 5, 1939

2,182,673

UNITED STATES PATENT OFFICE 2,182,673

SCREW DRIVER

Everino Magnano, Durham, Conn.

Application March 16, 1938, Serial No. 196,171

1 Claim. (Cl. 145—61)

My invention relates to the class of devices which are employed for the insertion of screws and for similar purposes, and an object of my invention, among others, is to provide an implement of this class that shall be simple and cheap in construction and particularly one in the use of which the blade may be arranged at an angle relatively to the handle and may also be rigidly secured when in an extended or straight position.

One form of a screw driver embodying my invention and in the construction and use of which the objects herein set out, as well as others, may be attained is illustrated in the accompanying drawing in which—

Figure 1 is a side view of my improved screw driver.

Figure 2 is a view in central lengthwise section through the same.

Figure 3 is a view of the handle showing the blade arranged at an angle thereto, said blade being broken off.

Figure 4 is a similar view in central lengthwise section.

Figure 5 is an end view of the implement as shown in Fig. 3.

Figure 6 is a view in cross section on a plane denoted by the dotted line 6—6 of Fig. 2.

Figure 7 is a view on enlarged scale in cross section on a plane denoted by the dotted line 7—7 of Fig. 2.

In the accompanying drawing the numeral 8 denotes the handle of my improved screw driver that is tubular in form and that may be knurled in a manner common to implements of this class. A carrier 9 is slidably mounted in the handle and has a recess 10 formed at one side through which a retaining pin 11 extends, this pin also extending through the handle, as shown in Fig. 6 of the drawing. A spring pressed detent 12 is seated on a spring 13 at the mouth of a socket 14, as shown in Fig. 2, this detent being preferably in the form of a ball so that it may be, by the application of a little force, passed to opposite sides of the retaining pin 11. It is of such size that it will not pass out of the mouth of the socket. In this manner the carrier 9 may be located in a retracted position as shown in Fig. 2 of the drawing or in an extended position as shown in Fig. 4.

The end of the carrier is slotted, creating ears 16, and a chuck 15 is rigidly mounted between said ears so that it may be extended as shown in Fig. 2 or located at an angle to the handle as shown in Fig. 3. This chuck has a tool receiving socket 17 within which the tool 18 is held, in the preferred form the socket having a retainer 19 in the bottom thereof, said retainer being cut back on one side to form a recess with a beveled edge to receive the end of the tool 18 that is similarly formed. The tool is therefore frictionally held in place but may be removed by the application of a little force. This is a common means of retaining a tool in a socket in a chuck.

In the use of the tool the carrier may be located at its inward position within the handle to rigidly hold the chuck in an extended position as shown in Fig. 2, or by drawing the carrier outwardly the chuck may be turned into an angular position as shown in Fig. 3 so that the tool will be located at an angle to the axis of the handle for the purpose of driving a screw.

It will be noted that when the carrier 9 is drawn inwardly the inner end of the chuck 15 is located within the hole in the handle and closely fits the same so that the chuck is firmly held in this position.

In accordance with the provisions of the patent statutes I have described the principles of operation of my invention together with the device which I now consider to represent the best embodiment thereof; but I desire to have it understood that the device shown is only illustrative and that the invention may be carried out by other means and applied to uses other than those above set out.

I claim:

A screw driver including a hollow handle, a carrier slidably mounted in the handle and having one side thereof flattened with abutment shoulders at the ends of the flattened portion forming a recess, a retaining pin secured to the handle and transversely projecting through said recess and to be engaged by said abutment shoulders to limit the movement of the carrier, a spring-pressed detent supported on the carrier and engageable with said pin, said spring-pressed detent being forcible to opposite sides of said pin to permit movement of the carrier in opposite directions, a tool holder pivotally attached to said carrier and adapted to be moved into the handle to retain said holder in an extended position, and means on said holder to removably receive a tool.

EVERINO MAGNANO.